(12) United States Patent
Theriault

(10) Patent No.: US 9,021,518 B2
(45) Date of Patent: Apr. 28, 2015

(54) SYSTEM TO AVOID VIEWING COMMERCIALS IN REAL TIME

(71) Applicant: Richard H. Theriault, Lincoln, MA (US)

(72) Inventor: Richard H. Theriault, Lincoln, MA (US)

( * ) Notice: Subject to any disclaimer, the term of this patent is extended or adjusted under 35 U.S.C. 154(b) by 127 days.

(21) Appl. No.: 13/898,578

(22) Filed: May 21, 2013

(65) Prior Publication Data
US 2014/0351843 A1    Nov. 27, 2014

(51) Int. Cl.
| | |
|---|---|
| H04N 7/16 | (2011.01) |
| H04N 7/10 | (2006.01) |
| H04N 7/025 | (2006.01) |
| H04N 21/2668 | (2011.01) |
| H04N 21/24 | (2011.01) |
| H04N 21/2665 | (2011.01) |
| H04N 21/454 | (2011.01) |

(52) U.S. Cl.
CPC ....... *H04N 21/2668* (2013.01); *H04N 21/2407* (2013.01); *H04N 21/2665* (2013.01); *H04N 21/4542* (2013.01)

(58) Field of Classification Search
CPC .......... H04N 21/812; H04N 21/44008; H04N 21/25891; H04N 21/4383; H04N 21/4532; H04N 21/8352; H04N 7/0887; H04H 20/106; H04H 60/46
USPC ............. 725/9, 22, 25, 32, 34–36, 37, 42, 46, 725/105, 114, 116, 120, 144, 146, 151; 386/250
See application file for complete search history.

(56) References Cited

U.S. PATENT DOCUMENTS

| | | | |
|---|---|---|---|
| 7,996,450 B1 | 8/2011 | Lee et al. | |
| 2002/0010930 A1* | 1/2002 | Shah-Nazaroff et al. | ........ 725/42 |
| 2002/0178444 A1* | 11/2002 | Trajkovic et al. | ............... 725/32 |
| 2008/0313669 A1* | 12/2008 | Acharya et al. | ................. 725/34 |

* cited by examiner

*Primary Examiner* — Hai V Tran
(74) *Attorney, Agent, or Firm* — Jerome E Sacks

(57) ABSTRACT

Presented is a system that allows a user who subscribes to the system to avoid viewing commercials with unacceptable content (e.g. alcohol related, sexual content) during real-time television broadcasts. The system has a residential component consisting of a control unit having a user interface a local database and a specialized router, a remote processing component having monitoring stations where the monitored network feeds are processed, and a system DBMS component that stores channel and user information in real time. The control unit is connected to the internet, such as via a wireless connection on the user's network, to retrieve remotely-stored data obtained through monitored network feeds. The control unit retrieves real-time data associated with viewable content and applies logic to switch the viewing channel or signal source for display on the television. The monitored network feeds are viewed on the system's monitoring stations and the earliest feed for each monitored channel determines the channel content.

6 Claims, 3 Drawing Sheets

| #1 Primary  Cable | #2        Cable |   |   |
| --- | --- | --- | --- |
| 505  ABC-HD  ☺  1:54  Alcohol | 570  ESPN-HD  ☺  12:48 |   |   |
| #3        Cable | #4  PC  - - - - - |   |   |
| 600  CNN-HD  ☺  5:11 |  |   |   |

Fig. 3

SYSTEM TO AVOID VIEWING COMMERCIALS IN REAL TIME

CROSS-REFERENCE TO RELATED APPLICATIONS

This application claims the benefit of the U.S. Provisional Patent Application No. 61/650,463 filed on May 22, 2013 by the present inventor. This provisional patent application is incorporated herein by reference.

BACKGROUND OF THE DISCLOSURE

As known in the prior art, television content is provided to home and businesses by local broadcast providers and network content providers. Local broadcast providers can deliver programming over the air (OTA) or through a local subscriber service, such as cable or satellite broadcasters. Many television networks, however, only provide programming content through local subscriber services.

National and regional network providers distribute their programming and commercial content through network feeds to the local broadcast providers and local subscriber services. The network feeds therefore provide the earliest available source for the content. Local broadcast providers and local subscriber services may replace network commercial content with local commercial content and otherwise process the content, such as compressing digital data. As a consequence, there are lags between when content is available on the network feed and when the content is delivered to the user.

To view programming from a local subscriber service, a subscriber device (e.g. cable or satellite decoder box) must be installed at the user location and connected to a television input. The user typically selects a viewing channel using a remote control unit that communicates with the subscription device using an infrared signal protocol.

Often a user may have an interest in watching multiple programs that are broadcast at the same time. The user can time-shift by recording one program while watching another program. That solution may not meet the user's needs. Instead, while viewing one program, the user may wish to change channels and view another program. That is typically done by manually selecting another channel. The user will then view the other program until deciding to change channels again. Such channel surfing is fairly common among sports fans, who may be interested in multiple live games during any one time slot. To facilitate channel surfing, some televisions employ Picture-In-Picture (PIP) technology to tune to multiple channels and display the content from each channel on the television monitor.

Regardless of the reason, there are some predictable times during programming when a user may wish to change the channel. One instance is during a commercial break, during which the user may prefer to watch programming on another channel instead of the commercials on the current channel. Another instance is during broadcast of a commercial with content deemed unsuitable to the user.

SUMMARY OF THE DISCLOSURE

A particular embodiment of the invention is a system to avoid viewing commercials during real-time television broadcasts.

The system can enhance the viewing experience of live television (TV) content, especially for the over 430 million households worldwide that currently subscribe to pay cable and satellite. It allows consumers to avoid viewing program supplied commercials, without losing programming content or requiring time shifting.

A particular embodiment of the invention includes a system for assisting the user in avoiding commercial content. The system is controlled by the user through a control unit having a user interface (UI). The control unit is connected to the internet, such as via a wireless connection on the user's network, to retrieve remotely-stored data. Through the user interface, the user can set viewing preferences that are to be applied to the television monitor at the user location. In particular, the control unit retrieves real-time data associated with viewable content and applies logic to switch the viewing channel or signal source for display on the television.

BRIEF DESCRIPTION OF THE DRAWINGS

FIG. 3 is a picture of user interface displaying the status of preference selections residing on the control unit.

DETAILED DESCRIPTION OF THE DISCLOSURE

As used in this specification and claims the terms DBMS and database are used interchangeably. The terms TV and television are used interchangeably. The terms TV is understood to apply generally to any device that receives and plays TV programming, such but not limited to, a smartphone or a computer. The terms "user interface" and UI are used interchangeably. The terms "over the air" and OTA are used interchangeably. The term "system database" is used herein to refer to a database that may reside in a single location or be distributed over several locations. The location and configuration of the system database is a production consideration. The term router is used herein refers to any small physical devices locatable in a residence that joins multiple networks together.

The term "network channel" refers to a TV signal transmitted over a particular network such as OTA, satellite providers, or cable. The term "viewing channel" refers to the TV signal received by a user's subscriber's device. The term "channel content" refers to the content of a real-time TV signal generated by a network provider. Examples of network channels are ABC-OTA, ABC-HD, CNN, and CNN-HD. The content of a network channel, e.g. ABC-OTA transmitted over OTA has channel content that is similar but not necessarily identical to the channel content of network channel ABC-HD transmitted over cable. We refer to these two channels as having the same "base channel". Two network channels having the same base channel have similar content. The term "channel", when used alone, depends on the context.

Figure 1:
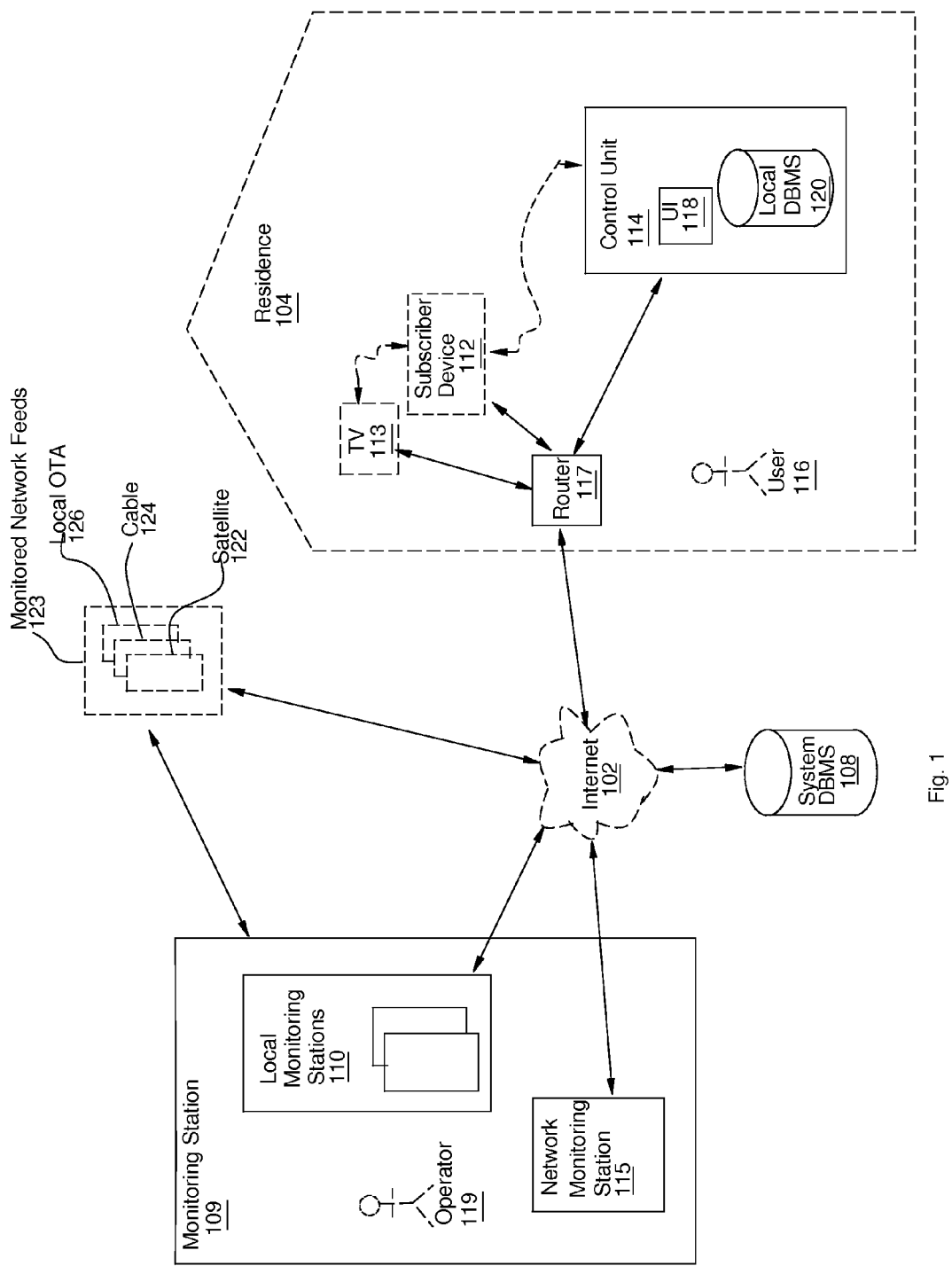
FIG. 1 is a schematic diagram of an automated television channel switching system used in the first embodiment of the present invention.

Two headed straight lines on FIG. 1 indicate wire, wireless or internet connections, depending on the context. The term residence is interpreted to mean any facility which has a TV connected to a subscriber device. This includes but is not limited to a home, commercial facility, or transportation vehicle. The term cable and cable provider are used interchangeability. If one or more objects are discussed in the detailed specification, only one may be shown in the figures. Like objects may use the same numerals.

First Embodiment

FIG. 1 is a schematic diagram of an automated television channel switching system in accordance with the first embodiment of the present invention. As shown, a residence 104 accesses television content via a subscriber device 112, e.g. a cable or satellite decoder box, for display on television 113. A user 116 controls, using an internet enabled control unit 114, the actual viewing channel and source for viewing, a router 117 for communicating with the internet 102 and the other components of the first embodiment in residence 104. User 116 can elect to automatically avoid viewing commercials, either entirely or selectively.

User 116 controls commercial avoidance through control unit 114. Control unit 114 is a remote control running commercial avoidance logic. Control unit 114 includes a user interface (UI) 118 and local database 120, and is capable of controlling a subscriber device 112 through an infrared (IR) or other communications technology such as RF, Bluetooth and direct connection to, as shown by the two headed arrows it connected with.

Control unit 114 is in communication with an internet accessible system DBMS 108, a Relational Database Management System. As will be described, system DBMS 108 includes data tables to indicate the content status of various viewing channels. The data tables are populated by a monitoring station 109, including a network monitoring station 111 and possibly one or more local monitoring stations 110.

The monitoring station 109 (i.e. network monitoring station 115, and one or more local monitoring stations 110) receives monitored network feeds 123 from various networks, whether national or regional. The network feeds include programming content and commercial content, which are then rebroadcasted by subscription providers (e.g., cable 124, satellite providers 122 and/or local OTA providers 126). Occasionally, providers replace commercial content from the network feed with local commercial content. Information related to the content is monitored in real time at the monitoring sites and data in the data tables are updated in real-time.

In some markets it may be desirable to include local monitoring stations 110 to monitor local broadcast content. One of ordinary skill in the art can modify the system to include local broadcast content from the following description. In addition, it may be more practical to rely on one or more commercial subscriber services for monitoring network content instead of network feeds. In that event, the commercial subscriber services should contribute the least amount of lag relative to the network feeds. For ease of understanding, the following description will focus on network feeds.

Figure 2:
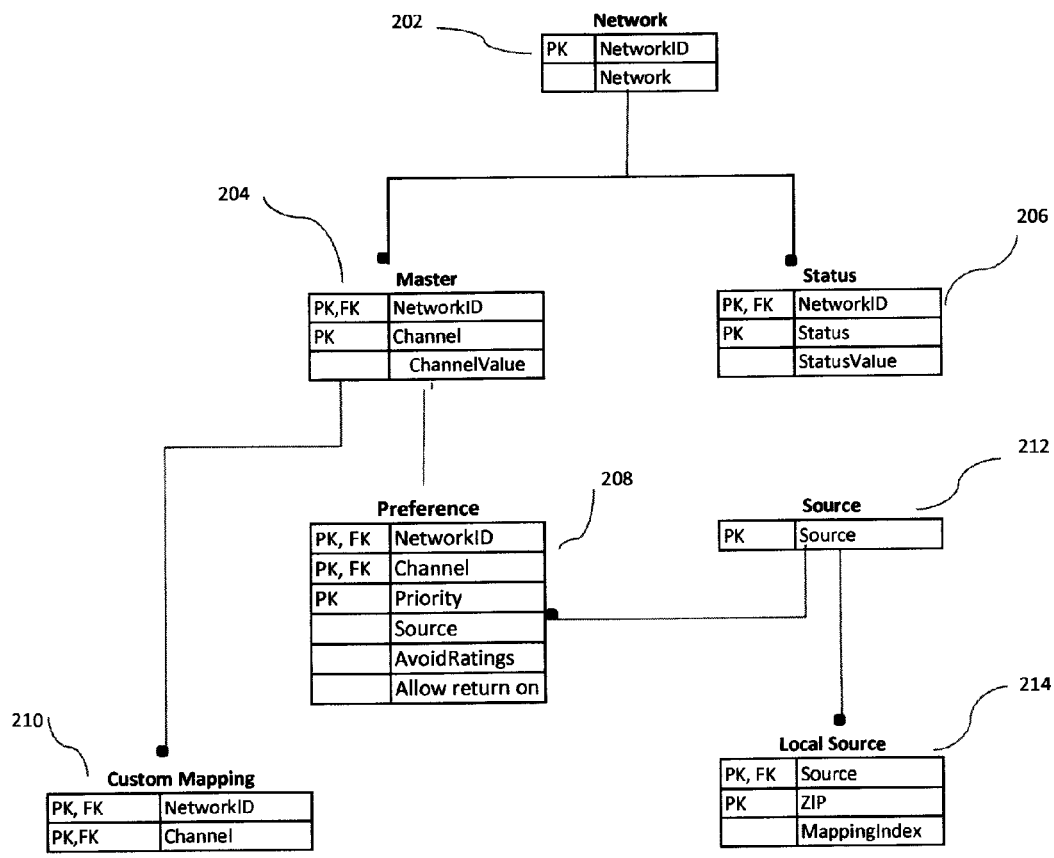
FIG. 2 is a database entity-relation-attribute diagram of the relational databases used in the first embodiment of the present invention.

FIG. 2 illustrated the entity relationship-attribute diagram of the various tables used in the first embodiment. In FIG. 2 PK represents a primary key and FK is an alternate key. Tables 1 through 5 are examples of tables with sample data stored in the two databases (system DBMS 108 and local DBMS 120) shown in FIG. 1. The database examples include Table 1, the Master Network Mapping Table, and Table 2, the Network Status Table, constructed from the network 202, and Master 204 relational table structures. Table 1 maintains a master mapping for networks to a plurality of subscriber channels, e.g. Channel (A), Channel (K), and Channel (N). The table includes a NetworkID field (e.g. ABC-HD, CNN-HD) and a plurality of indexed Channel fields e.g. 505, 600, 520 for channel (A). It is constructed from table structures Network 202 and master 204 shown in FIG. 2.

TABLE 1

Master Network Mapping Table

| NetworkID | Channel (A) | Channel (K) | Channel (N) |
|---|---|---|---|
| ... | ... | ... | ... |
| ABC-HD | 505 | 5.1 | 805 |
| ... | ... | ... | ... |
| CNN_HD | 600 | — | 842 |
| ... | ... | ... | ... |
| ESPN-HD | 570 | — | 849 |

Referring to Table 1, the NetworkID column stores unique identifiers for all supported network feeds i.e., network feeds being monitored. It should be understood that separate table rows can be used for high-definition (HD) and standard definition (SD) feeds. Each Channel column stores a channel number for the supported network based on a particular broadcast medium. The medium can be a cable provider, a satellite provider, or OTA broadcasts. Each column is specific to not only a particular medium but also a particular physical location for the user, typically based on ZIP code. Note that for simplicity of exposition, ZIP code is left out of the structures in FIG. 2 and in Tables 1 to 5. However, they can easily be added by including the ZIP code as a primary key in the Network 202 table structure and as primary and foreign keys in all the children tables of Network 202. If added, they would also be added as a column to each of Tables 1-5.

All supported networks (i.e., those networks having monitored feeds) are mapped to all supported broadcast mediums (i.e., those used by system users). In the example shown, ABC-HD is for use with one cable provider, channel e.g. 805 for use with a second cable provider, and channel 5.1 for OTA tuning. Because CNN-HD and ESPN-HD are not provided by OTA broadcasts, channels are only mapped for the two cable providers.

Referring now to Table 2, the Network Status Table, constructed from network 202 and Status 206 relational table structures, includes columns for identifying a Network ID field, an InCommercial field, a Rating field, and a Timer field. The NetworkID column again stores a unique identifier for all supported networks. The InCommercial column stores a Boolean value (Y or N) to indicate whether the particular network is in-commercial (Y) or not in-commercial (N). The Rating column stores the known subject matter of the commercial, such as alcohol, sex, violence, language, commercialism, poor portrayals of racial or ethnic groups, or any other subject matter that concerned users may find offensive or distasteful. The Rating field can also be used to expand on the typical ratings provided for programming content.

TABLE 2

Network Status Table

| NetworkID | InCommercal | Rating | Timer |
|---|---|---|---|
| ... | | | |
| ABC-HD | Y | Alcohol | 1.54 |
| ... | | | |
| CNN_HD | N | | 5.11 |
| ... | | | |
| ESPN-HD | N | | 12.48 |

Again, referring now to Table 2, the Timer column stores the cumulative time since the InCommercial field last changed value. In other words, the Timer field indicates the length of time that the network has been in-commercial or broadcasting programming content.

Referring to FIG. 1, the monitoring stations populate Table 2, the Network Status Table, through a manual process, an automated process, or a combination of manual and automated processes. In a particular embodiment, a human operator 119 monitors one or more network feeds and signals when a network begins broadcasting commercials, thereby setting the InCommercial field to "Yes". When the network returns from commercial to programming content, operator 119 signals again to set the InCommercial field to "No". Each change in the InCommercial field value resets the value in the Timer field.

While the InCommercial field is set to "Yes", an automated process can attempt to match the initial series of video frames for the running commercials to a library of known commercials. Those known commercials have been subjectively evaluated for content and ratings. Those predetermined ratings are then used to populate the Rating field in the Network Status Table.

At the residence 104 of a user 116, control unit 114 accesses the local database through a persistent connection and uses the Network Status Table to avoid commercials according to user preferences. To facilitate the operation, the control unit employs a local database 120.

Tables 3 through 5 are examples of tables stored in local DBMS 120 for the control unit 114 illustrated in FIG. 1. As shown, the local database includes a Table 3, the Preference Table, Table 4, the Local Source Table, and Table 5, the Custom Mapping Table. These tables are constructed from table structures 202 through 214 shown in FIG. 2. The column AvoidRatings is also referred to as unacceptable content to the user 116. This is accomplished using Table 4: Local Source Table, which the user populates during initial set up.

Table 4, the Local Source Table, includes a Source field and a MappingIndex field. The Local Source Table is initially populated during a setup process, where the user identifies channel lists based on the user's viewing location. In particular, the user may be prompted for a ZIP Code and offered a selection of viewing sources (cable, satellite, OTA) and can select those that apply.

The Source column identifies the active television source inputs, such as antenna, cable, CableCard, PC, etc. The MappingIndex column identifies the index into the Master Network Mapping Table for the particular source input. That is, once the user selects the relevant cable, satellite, or OTA table based on ZIP code during setup, the resulting index is locally stored in the Local Source Table.

While Table 4, the Local Source Table, will generally point to Table 1, the Master Network Mapping Table, to retrieve network and channel associations, there are situations when the Master Network Mapping Table is inadequate. For example, the user's provider may not be supported or the user is employing the cable-ready television feature to tune cable channels. In those cases, the user can manually create the appropriate network and channel associations in Table 5: Custom Mapping Table having NetworkID and Channel fields. To ease the creation process, the system can pre-populate the NetworkID column from the Master Network Mapping Table.

While the data can be exploited in numerous ways, one goal of the invention is to provide a mechanism for a user to

TABLE 3

Preference Table

| Priority | Source | NetworkID | Channel | AvoidRatings | AllowReturnOn |
|---|---|---|---|---|---|
| 1 | Cable | ABC-HD | 505 | Alcohol, Sex | NoCommercial |
| 2 | Cable | CNN_HD | 600 | Alcohol, Sex | AnyOther |
| 3 | Cable | ESPN-HD | 570 | All | AllowReturnOn |
| 4 | PC | — | | | |
| ... | | | | | |

TABLE 4

Local Source Table

| Source | MappingIndex |
|---|---|
| Antenna | K |
| Cable | A |

TABLE 5

Custom Mapping Table

| NetworkID | Channel |
|---|---|
| ... | |
| ABC-HD | |
| ... ; | |
| CNN_HD | |
| ... | |
| ESPN-HD | |

To make use of Table 2, the Network Status Table, control unit 114 must map the user's broadcast channels to the network feeds. That is accomplished by Table 1, the Master Network Mapping Table, based on the input sources available leave a network during a commercial break and automatically return to the network after the commercial break. For example, the user may be interested in watching live sporting events and may be most interested in a particular sporting event. However, during commercial breaks, the user would prefer to tune to another game or program instead of watching commercials. That is accomplished by utilizing the Preference Table.

As shown, the Preference Table includes a Priority field, a Source field, a NetworkID field, and a Channel field. The Preference Table can also include an Avoid Ratings field, and an AllowReturnOn field. The Priority column is a numerical priority starting with 1, the highest priority, indicating the primary viewing preference. As shown, there are four entries in the list, but there may be fewer or more. The Source column indicates the input source device for the television (Cable, DVD, Tuner, PC, Internet, etc.) as defined during initial setup, which can include identifying a default source. The NetworkID column again stores selected unique identifiers for the supported network. An entry can be manually entered by user 116, or derived from the associated Channel field using the Local Source Table to access the Master Network Mapping Table. The Channel column is used for tunable sources to identify a selected channel number. An entry can be manually entered by user 116, or derived from the associated NetworkID field using the Local Source Table to access the Master Network Mapping Table. The AvoidRatings column stores in-commercial ratings that the user wishes to avoid viewing. The user 116 can indicate a desire to avoid all commercials, specific supported ratings, or none. The AllowReturnOn column stores an indication of when the system can automatically switch to each selected channel. The choices are when there is no commercial (NoCommercial) (i.e. InCommercial="No") or when the commercial is other than an avoided commercial (AnyOther). Note that if user 116 selects to avoid All commercials on a particular channel, the AllowReturnOn field must be set to NoCommercial.

It should be noted that if the Source field indicates a non-tunable input, such as a PC input, there would be no commercials to be detected. As such, any lower priority preference would never be reached. As shown, therefore, the PC source is the last entry on the preference list.

In addition, the contents of the Preference Table can be changed at any time by the user to accommodate programming schedules. In a particular embodiment, logic is embedded into the user's subscriber device and integrated with the on-screen channel guide to facilitate entry of preferences into the table. Furthermore, while only a single Preference Table is shown, representing the current, active Preference Table, the user can create and store multiple Preference Tables for future use. That can be particularly convenient to create favorite Preference Tables for frequent viewing habits.

FIG. 3 is a picture of user interface 118 displaying the status of preference selections residing on control unit 116. As shown, the preference selections are arranged in a grid for display. Each grid cell displays organized information relevant to an individual preference selection. Displayed data is retrieved from the Preference Table and the Network Status Table. For example, each cell displays the Priority and Source fields from the Preference Table, with the primary preference identified. Where appropriate, the Channel and Network fields from the Preference Table are also displayed, and may include a network logo or call signs for the local network affiliate. The InCommercial, Rating, and Timer fields are also displayed in the cell. Note that a symbol or icon can be used for the InCommercial status. The Rating data can be displayed as text or converted to symbols or icons. Additional data fields, such as the AvoidRatings and AllowReturnOn fields, can also be displayed.

In the first embodiment, the user provides an ordered list of preferences headed by the user's primary source/channel preference. The user will be viewing the primary preference whenever it is not in-commercial. As long as the primary preference is in-commercial, however, the user will be viewing one of the other source/channels on the list. More specifically, the user will be viewing the highest ranked preference that is not currently in-commercial.

Alternate Embodiments

In an alternate embodiment, subscriber device 112 may be replaced by local over-the-air (OTA) broadcasts.

In another alternate embodiment, control unit 114 is capable of controlling subscriber device through signal or network commands.

In other alternate embodiments, the control unit is a personal computer or smartphone running a commercial avoidance application. The commercial avoidance logic can also be embedded into subscriber device 112 and/or television 113, or use other technology such as RF, Bluetooth, and direct connection to the device.

While FIG. 1 and tables 1 through 4 are shown having a particular structure to ease description, other database structures can be used. In particular, each table can further include a separate unique key field. Furthermore other database structures other than relational database management systems may be used.

In another alternate embodiment, the switching logic is responsive to the InCommercial field in the Network Status Table. As long as the InCommercial field for the primary preference is "Yes", the television will be tuned to another preference. In particular, once the InCommercial field for the primary preference goes to "Yes", the television will be switched by the control unit in accordance with the highest-ranked preference that has its InCommercial field set to "No". The control unit will keep the television tuned to that preference until either the InCommercial filed for primary preference goes to "No" or the InCommercial field of the current preference goes to "Yes". For the former, the control unit automatically returns to the primary preference regardless of the status of the current preference. For the latter, the control unit will again switch the television in accordance with the highest-ranked preference that has its InCommercial field set to "No".

In another alternate embodiment, the switching logic includes further logic to make use of the Timer field in the Network Status Table to reduce brief switching intervals. In particular, it can be expected that commercial breaks are generally divided into several 30 second intervals. Consequently, if the Timer field indicates that the primary preference may be nearing the end of several 30 second intervals, the logic may briefly pause before switching to an alternative preference. Similarly, if a preference has been out of commercial for an extended period of time, the logic can anticipate that a commercial may be forthcoming and therefore bypass that preference in favor of a lower-ranked preference that has been out of commercial for less time. Use of the Timer field can be a user option, selected when setting up the Preference Table. In a further embodiment, the user can select the length of the brief pause from 0 seconds to some reasonable limit, such as 5 seconds.

While the above examples illustrate embodiments for avoiding commercials in general, a user may desire to avoid only certain types of commercials. For example, particular classes of users are offended or prefer to avoid certain subject matter, including commercials related to sexuality, alcohol, violence, etc. In such cases, the user can so indicate during initial setup. The above logic can then be modified to switch preferences based on the contents of the Rating field in the Network Status Table and the AvoidRatings and AllowReturnOn fields in the Preference Table.

It should be understood that the stored data can be used for purposes other than automatic switching. For example, the data itself can be useful for manual switching or channel surfing. In particular, the control unit or on-screen channel guide can graphically display the status of the user's favorite channels. That would allow the user to make an intelligent manual channel selection. Furthermore, in a particular embodiment, the user can manually override an automatic channel selection.

As noted above, the control unit includes a user interface to facilitate user operation of the system. Generally, the user employs the user interface to set up and operate the system to enhance the user viewing experience.

It should be understood that in certain embodiments, the user employs the displayed grid structure to enter data into the Preference Table. Furthermore, the user can manually select a channel to view by selecting a preference from the grid, or manually entering a channel number. In the event that a manual change is made to the automated channel selection, the system can be programmed to always return to the primary preference once it returns from commercial, i.e. as long as the Preference Table is active. Of course, other suitable display formats and techniques can be employed in the control unit.

As noted above, timing lags exist between when content is distributed over the network feeds and when the user views the content. The exact lag will depend on the user's local subscriber service and local broadcasters. That timing difference tends to be repeatable from one day to the next. To accommodate different lags and to allow the timing to be synchronized, a timing bias is established during the initial setup process. That bias can be established on a channel-by-channel basis. It can also be fine-tuned by the user after installation. While this invention has been particularly shown and described with references to particular embodiments, it will be understood by those skilled in the art that various changes in form and detail may be made without departing from the scope of the invention encompassed by the patented claims. For example, various features of the embodiments described and shown can be omitted or combined with each other.

The disclosure presented herein gives several embodiments of the invention. These embodiments are to be considered as only illustrative of the invention and not a limitation of the scope of the invention. Various permutations, combinations, variations and extensions of these embodiments are considered to fall within the scope of this invention. Therefore the scope of this invention should be determined with reference to the claims and not just by the embodiments presented herein.

What is claimed is:

1. A system used to avoid viewing unacceptable content on at least one viewing channel in real time for a residence of a user, said user located in said residence, said residence of said user having a subscriber device, said residence additionally having a television controlled by said subscriber device, said system being comprised of:
   a monitoring station;
   a system database, said system database stores:
      a plurality of real-time-network-channel information received by said monitoring station, each real-time-network-channel information belonging to a base channel;
      viewing channel data received by said user;
      data preference characterizing existence and type of unacceptable content;
   wherein
      said monitoring station communicates with said system database and said residence of said user,
      said monitoring station receives a plurality of real-time-network-channels from at least one of a local OTA, a cable provider, and a satellite feed,
      said monitoring station identifies an earliest feed for each real-time-network-channel for each of said base channels,
      said monitoring station evaluates said content of each of said earliest feed for a plurality of said base channels as to having unacceptable content of one or more types,
      said monitoring station is operated by at least one operator, each of said operators visual observing earliest feed and determining said existence and said type of unacceptable content and entering said start time, said end time and said type of unacceptable content in said system database,
      said monitoring station determines a delay time between said earliest feed and each of the other feeds for the same said base channel, and determines start time and end time of said earliest feed as to said unacceptable content in each of said network channels of each of said base channel, and
      said monitoring station communicates to said residence of said user for a plurality of said viewing channels a user signal containing said start time, said end time and said type of said unacceptable content of said user, properly accounting for said delay time.

2. The system of claim 1 wherein said monitoring station sends said user signal containing said delay time to a plurality of residences.

3. The system of claim 1 wherein said monitoring station is further comprised of a set consisting of a network monitoring station, a least one of a local monitoring station and a combination thereof.

4. The system of claim 1 further comprised of:
   a residence component; said residence component installed in said residence of said user, said subscriber device communicating with said residence component; said residence component being comprised of:
   a control unit;
   a router;
   wherein said control unit communicates with said router and with said subscriber device
   wherein said control unit has commercial avoidance logic which switches viewing channels on said television to avoid displaying said unacceptable content based on received signal containing said start time and said end time and said type of unacceptable content received from said monitoring station.

5. The system of claim 4 wherein said unacceptable content is comprised of a set selected from the group consisting of commercials, alcohol content, sexual content, violence, adult content, and a combination thereof.

6. The system of claim 4 said residence component has a local database communicating with said control unit, said local database containing data comprised of received viewing channels, unacceptable content and said type of unacceptable content and switching priority entered by said user.

* * * * *